United States Patent Office 3,789,044
Patented Jan. 29, 1974

3,789,044
NOVEL CURED COMPOSITIONS PREPARED FROM THE REACTION OF A POLYISOCYANATE AND A HYDROXYBENZOIC ACID CAPPED EPOXIDE-CONTAINING MATERIAL
David D. Taft, Minneapolis, and Roger A. Schmidt, Burnsville, Minn., assignors to Ashland Oil, Inc., Houston, Tex.
No Drawing. Filed Jan. 26, 1971, Ser. No. 109,986
Int. Cl. C08g 5/00
U.S. Cl. 260—18 TN
16 Claims

ABSTRACT OF THE DISCLOSURE

A novel composition is prepared by combining a polyisocyanate and a hydroxybenzoic acid capped epoxide-containing material. This combination of ingredients can be rapidly cured at room temperature to essentially its ultimate state of use by contacting the combination with a tertiary amine to yield a durable, flexible, and caustic resistant material.

BACKGROUND OF THE INVENTION

It has been known heretofore in the prior art to react polyepoxides with polyisocyanates to get a film product characterized by toughness, strength and resistance. Furthermore, it is also known in the prior art to form resinous compositions based on modified epoxides or polyepoxides which can be crosslinked or cured with various crosslinking agents to tough, resistant products. The prior art is exemplified by the following patents:

| | |
|---|---|
| 2,698,315 | 2,935,488 |
| 2,732,367 | 3,019,212 |
| 2,759,901 | 3,385,949 |
| 2,783,214 | 3,378,527 |
| 2,907,719 | 3,497,524 |

U.S. Pat. 2,698,315 is concerned with forming a resinous polymer from epoxide containing compounds such as epichlorohydrin or glycerol dichlorohydrin and dihydroxy diphenyls or diphenols to yield polymeric epoxide resins containing both terminal epoxide groups and intermediate hydroxyl groups. The patent further discloses that the resinous compositions can be crosslinked with polyisocyanate materials if so desired to render them suitable as coating and molding compositions.

Other U.S. patents disclose certain specific acid modifications of polyepoxides. Exemplary of such patents are U.S. Pats. 2,732,367 and 2,759,901. The former is concerned with the reaction of polyepoxide materials with a phosphonic acid to impart improved flame resistance and flexibility to the polyepoxide material, and the latter is concerned with the reaction product of an epoxide resin with monocarboxylic acids such as saturated and unsaturated fatty acids and other monobasic acids to impart improved chemical resistance and flexibility to the resin. Each reference discloses that the above reaction products can be reacted with a polyisocyanate or other crosslinking material to yield highly crosslinked, complex resinous products.

When the polyepoxide resins or modified polyepoxide resins of the prior art are combined with polyisocyanates and cured to effect a crosslinking reaction, the majority of these crosslinking reactions require heating to high temperatures to initiate and maintain the crosslinking reaction. Of those prior art processes wherein the curing step can be carried out at room temperature, unusually long curing times are required.

As can be seen from the discussion of the prior art, there has been work in the area of modifying polyepoxide materials in order to alter the properties of the polyepoxide polymers to form materials for a desired use. There have, however, been no successful efforts, to the best of our knowledge, with regard to the formation of epoxide-containing compositions of improved properties which may be cured with a polyisocyanate in the presence of a tertiary amine rapidly at room temperature to essentially their final desired state. The compositions of this invention are curable in this manner and produce products which are flexible, have relatively high strength properties, are durable, and exhibit excellent resistance to caustic materials.

The present invention relates to the production of such novel materials. More particularly, this invention relates to compositions prepared by curing a combination of a phenolic-functional resin and a polyisocyanate in the presence of a tertiary amine at room temperature. Specifically, this invention relates to improvements in such compositions enabling its use in a variety of coating, binder, and other applications.

In the coating art, for example, a coating composition generally is prepared in an organic or aqueous solvent, is applied to a surface, and the solvent is allowed to evaporate. Normally, the composition requires heating and/or prolonged air drying in order to cure or harden the coated surface by solvent evaporation, oxidation or chemical curing. A variety of such coating systems such as varnishes and baking alkyds are known. Reduction in the period of time required to cure coatings and elimination of a heat treatment, particularly where the materials to be coated are heat sensitive, is particularly desirable.

Curable compositions based on polyisocyanates and a variety of active hydrogen-containing materials such as phenolic resins are known. The problems encountered when adapting such systems to coating, binder and other applications include those mentioned above; namely, that heating or curing for extended periods of time is required to give a properly cured and useful coating. On the other hand, where the system is catalyzed for a quick cure, problems arise with respect to the pot life of the composition.

In U.S. Pat. 3,409,579, issued Nov. 5, 1968, there are disclosed certain polyisocyanate-phenolic resin compositions which can be cured with amines and which may be useful as coatings. It has now been found that certain of these combinations of polyisocyanates and phenolic resin compositions, useful as binders for foundry core applications by virtue of their superior adhesion and tensile strength when applied to sand and the like, are not entirely suitable for certain coating as well as other applications because their color and color retention properties, flexibility and caustic resistance are not suitable for aplications where durability, flexibility and resistance are highly desirable properties. The problems noted with many polyisocyanate-phenolic combinations is that initially the color of the composition is slightly off-white to significantly yellow and that the color characteristics are affected by aging, particularly under ultraviolet light conditions. Furthermore, these systems have inferior durability over extended periods of time. Such combinations would not be suitable in applications where clear and colorless coatings, for example, are desired or where the coatings are pigmented with a white or other light-colored pigment and whose appearance would be adversely affected by the initial yellowing or the yellowing upon aging of the binder or vehicle. Also, pot life of the compositions, although adequate for foundry applications, is not entirely satisfactory for many other applications.

For the most part, these aforementioned polyisocyanate and phenolic resin combinations have inadequate solvent and caustic resistance for some coating, or other applications where such resistance is a highly desirable property. Moreover, these prior art materials have poor flexibility when the composition, as applied, must exhibit flexibility in its ultimate use (such as coatings or flexible binders).

It has been discovered that these and other problems in the prior art can be overcome by selectively capping an epoxide- (or oxirane-) containing material with a hydroxybenzoic acid and curing the resulting composition to essentially its final state with a polyisocyanate in the presence of a tertiary amine. The compositions of the instant invention have the improved characteristics discussed previously, which characteristics have been lacking in the phenolic resin-polyisocyanate compositions of the prior art: improved color and color retention, good weatherability, good caustic resistance, and improved flexibility. In some cases, higher solids application systems are achieved by using the compositions described in the instant invention as compared to those compositions of Pat. 3,409,579.

Objects of the invention

Thus, it is an object of the present invention to provide improved compositions and a method of curing same.

It is an additional object of the present invention to provide novel compositions that are rapidly curable to essentially their final state at room temperature and that have good pot life.

Yet another object of the present invention is to provide coating and binder compositions of improved color and weathering characteristics which are suitable for, among other uses, use in paints and varnishes.

A still further object of the present invention is to provide coating and binder compositions of improved weatherability, caustic resistance, and flexibility, which compositions exhibit good adhesion to a variety of substrates.

An additional object of the present invention is to provide a process for rapidly and effectively curing the compositions of this invention.

These and other objects of the present invention will become apparent to one skilled in the art from the description of the invention and the claims that follow.

Description of the invention

Broadly, this invention relates to compositions comprising the combination of hydroxybenzoic acid capped epoxide-containing materials with sufficient polyisocyanate to crosslink the hydroxybenzoic acid capped materials. The compositions are intended, in one embodiment of the invention, to be coated on a substrate and cured with a tertiary amine.

According to the present invention, novel compositions are provided which cure at room temperature. The novel compositions of the present invention are generally made available as a composition comprising a hydroxybenzoic acid capped epoxide-containing composition and a polyisocyanate, stabilized optionally with acid or the like, and containing optionally an appropriate amount of organic solvent and other additives such as pigments, plasticizers, and the like. At the time of use, the composition is applied by conventional means, i.e. brushing, spraying, rolling or the like, and is brought together with a tertiary amine. In a brief period of time, e.g. within seconds or minutes, the product of this invention has cured to a desired state more rapidly than the compositions of the prior art and/or exhibits improved properties over the prior art. When used as a coating composition, for example, the product of this invention cures to a tack-free state within seconds or minutes and is hard enough to withstand handling without deformation or smearing of the coating. Furthermore, when so applied, products coated with the novel compositions of this invention and cured according to the method of this invention are durable enough to withstand the handling required for boxing, shipping, etc., within anywhere from 10 minutes to 4 hours. This time for safe handling is determined by the exact component makeup of the composition and the type of film properties desired in the ultimate coated product. In most cases, the compositions of this invention, when applied as coatings, exhibit about 50 to about 65% of their final film properties 10 minutes after exposure to a tertiary amine for 15 seconds. In other cases, these same film properties are reached within as little as 2–3 minutes after exposure to a tertiary amine for 15 seconds.

For the purposes of clarity and definition, the phrase "hydroxybenzoic acid capped epoxide-containing composition" is intended to define the reaction product of hydroxybenzoic acid and epoxide-containing materials regardless of whether or not the product contains any unreacted epoxide groups upon the completion of the reaction. The presence or absence of epoxide moieties is determined by the amount of hydroxybenzoic acid reacted with the epoxide-containing material. From this point on in the disclosure, the term "hydroxybenzoic acid capped epoxide-containing composition" is inclusive of all products of the reaction of a hydroxybenzoic acid and the epoxide-containing material.

In U.S. Pat. 3,409,579, it is disclosed that certain phenolic resin-polyisocyanate mixtures may be used as coating compositions and cured at room temperature. The preferred phenolic resin are the condensation products of a phenol having the general formula:

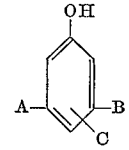

wherein A, B and C are hydrogen, hydrocarbon radicals, oxyhydrocarbon radicals, or halogen. The condensation product of a phenol of the aforementioned structure with an aldehyde having the general formula R'CHO wherein R' is a hydrogen or a hydrocarbon radical of 1 to 8 carbon atoms, is prepared in the liquid phase under substantially anhydrous conditions at temperatures below about 130° C. in the presence of catalytic concentrations of a metal ion dissolved in the reaction medium. The preparation and characterization of these resins is disclosed in greater detail in U.S. Pat. 3,485,797 issued Dec. 23, 1969. These resins have the general formula:

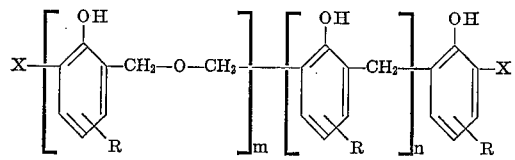

wherein R is a hydrogen or a phenolic substituent meta to the phenolic hydroxy group, the sum of $m$ and $n$ is at least 2 and the ratio of $m$ to $n$ is at least 1, and X is an end-group from the group consisting of hydrogen and a methylol group, the molar ratio of said methylol-to-hydrogen end-groups being at least 1.

In such a phenolic resin structure or in other phenolic resins which can be employed in the above patent, a high crosslink density is achieved on curing with a polyisocyanate. This often leads to excessive solvent entrapment during curing and to inflexible films once curing has occurred. Furthermore, because of the close proximity of the phenolic groups in the composition in the above patent, some of the groups may be left unreacted after curing. These unreacted or un-crosslinked phenolic groups are subject to ionization in the presence of an alkali or caustic and as a result are more susceptible to caustic degradation. For many coating as well as other applications where a high degree of flexibility and resistance is desired in the cured product, the use of such phenolic resins cured with polyisocyanate is not desirable. Also, these phenolic resin compositions on exposure to ultraviolet light and other weathering conditions often degrade leading to excessive chalking and yellowing of the coating.

This is true of the known and conventional phenolic resins such as the novolaks, resoles, resitoles and resites, generally, when cured with the polyisocyanate in the presence of a tertiary amine.

This invention makes it possible to provide compositions which are flexible and which rapidly cure to give durable, weathering properties. The compositions of this invention also exhibit improved caustic resistance, color-retention properties, etc., thus overcoming a number of deficiencies in the compositions of the prior art. These compositions can be coated on a variety of substrates such as paper, textiles, metal, glass, and wood in typical coating applications to give superior, rapid-cure coatings.

The products of this invention are formed from the crosslinking reaction of a hydroxybenzoic acid capped epoxide-containing composition with a polyisocyanate. The hydroxybenzoic acid capped epoxide-containing composition is prepared by capping an epoxide-containing material with a hydroxybenzoic acid, which acid will be later described in detail.

Suitable epoxide-containing materials include the internal epoxide compounds such as epoxidized fatty compounds and the various alicyclic polyepoxides and the terminal epoxide-containing compounds such as glycidyl-containing compositions.

Such epoxidized fatty compounds include epoxidized fatty oils (e.g., epoxidized soybean oil), epoxidized fatty acid esters of monohydric alcohols (e.g., epoxidized methyl linoleate), epoxidized fatty acid esters of polyhydric alcohols (e.g., epoxidized tetra tall oil fatty acid esters of pentaerythritol), epoxidized fatty nitriles (e.g., epoxidized linoleyl nitrile), epoxidized fatty amides, epoxidized fatty amines, and epoxidized fatty alcohols. Such epoxidized fatty compounds are already well known in the art. The preferred internal epoxide-containing materials are the curable epoxidized fatty acid esters of polyhydric alcohols.

As noted, glycidyl-containing materials are also suitable for use in this invention. Thus, the diglycidyl ether of a polyol such as glycerine, a polyether polyol such as the composition sold under the name Pluracol P 410, and bisphenols such as Bisphenol A may be reacted with the hydroxybenzoic acids to prepare hydroxybenzoic acid capped epoxide-containing compositions with free phenolic groups. Also, higher molecular weight materials prepared by varying the molar ratios of Bisphenol A and epichlorohydrin may be utilized in this invention.

Other suitable epoxide-containing materials are the alicyclic diepoxide materials such as the product sold under the name Unox 201. These materials are described in U.S. Pats. 2,890,194; 2,890,195; 2,890,196; 2,890,197; 2,890,-209; 2,890,210; and 2,917,469. These materials are the substituted and unsubstituted 3',4' - epoxy - cyclohexylmethyl - 3,4 - epoxy - cyclohexane-carboxylates. Other alicyclic epoxides include dicyclopentadiene diepoxide and limonene diepoxide.

Preferred epoxide-containing materials are acrylic copolymers containing copolymerized glycidyl acrylate or methyacrylate units. These acrylic copolymers can be prepared by the reaction of $C_1$–$C_{18}$, more preferably $C_1$–$C_{12}$, esters of alpha-beta unsaturated mono- or dicarboxylic acids with either glycidyl acrylate or methacrylate. Other glycidyl-containing copolymerizable monomers, such as diglycidyl itaconate, diglycidyl maleate, and the like, can be used as the glycidyl-containing monomers. These monomers can be copolymerized optionally in the presence of other copolymerizable monomers such as vinyl aromatic materials (i.e., styrene, alpha-methyl styrene and vinyl toluene), acrylonitrile or methacrylonitrile, and the like. These acrylic copolymers are prepared by conventional techniques known to the art whereby the monomers are polymerized in solution or dispersed form in the presence of initiators such as benzoyl peroxide or azo-bis-isobutyronitrile. These same acrylic copolymers can also be prepared at high temperatures under pressure in the manner disclosed in Canadian Pat. No. 856,347. It is further contemplated that other epoxide-containing acrylic copolymers, for example, those containing epoxidized oleoyl acrylate or methacrylate moieties, are within the scope of this invention.

These pre-formed glycidyl-containing materials, such as the glycidyl-containing acrylates; the alicyclic diepoxides; the bisphenol-epichlorohydrin adducts; or the epoxidized fatty materials are subsequently reacted with a hydroxybenzoic acid to form an ester composition which contains both free hydroxy and free phenolic groups. One of the distinct advantages of using epoxide-containing materials is the rapid reaction with the hydroxybenzoic acid as compared to the more difficult esterification or transesterification (when the acid is in its ester form) reaction with a a hyroxy-containing material. Thus, the hydroxybenzoic acid can be more readily and rapidly reacted with an epoxide-containing material to form phenolic-functional capped ester compositions for use in rapid curing with polyisocyanates. Another distinct advantage of using epoxide-containing materials is that in the reaction of the hydroxybenzoic acid with the epoxide-containing material, an ester alcohol is formed. When this material is cured with a polyisocyanate in the presence of a tertiary amine, initial and rapid reaction occurs between the phenolic hydroxy group and the polyisocyanate. Then a slower reaction occurs between the free hydroxy groups generated by the reaction of the hydroxybenzoic acid with the epoxide-containing material and any free isocyanate groups of the polyisocyanate reactant. This latter reaction forms a more stable carbamate linkage than that formed between the reaction of the phenolic-functional moiety and the isocyanate moiety. Thus, a dual curing mechanism occurs upon reaction of the polyisocyanate with the hydroxybenzoic acid capped epoxide-containing compositions in the presence of a tertiary amine.

The epoxide-containing materials discussed previously are reacted with up to a stoichiometric amount of a hydroxybenzoic acid to produce the hydroxybenzoic acid capped epoxide-containing compositions. If less than a stoichiometric amount is employed, a composition will be formed which will contain some unrecated epoxide rings. The reaction between the hydroxybenzoic acid and the epoxide-containing material can be represented by the following:

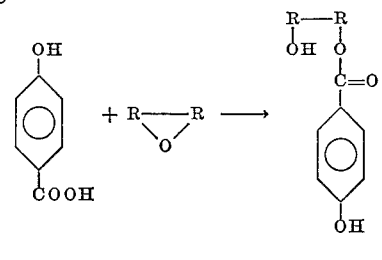

where

represents the epoxide-containing material. The amount of hydroxybenzoic acid preferably reacted with the epoxide-containing material contemplated by this invention is from 20–100% based on the reactive epoxy content of the epoxide-containing material. The more preferred amount is from 60–100% based on the said reactive epoxy content.

Suitable hydroxybenzoic acids include para, meta, and ortho hydroxybenzoic acids. A general structure for these hydroxybenzoic acids has the following structure:

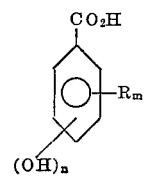

wherein R can be H, an alkyl $C_1$–$C_8$ group or an aromatic group; $n+m$ cannot be greater than 5; and $n$ must be at least 1. Preferably, R is equal to H and $n$ is equal to 1. The preferred hydroxybenzoic acids are para- and meta-hydroxybenzoic acids. The hydroxybenzoic acid is reacted with the di- or poly-epoxide-containing material until essentially all of the carboxylic acid functionality of the hydroxybenzoic acid has esterified with the di- or poly-epoxide-containing material. There is, thus, obtained a hydroxybenzoic acid ester of an epoxide-containing material which contains both free phenolic groups and free hydroxy groups formed as a result of the breaking of the epoxide ring. These phenolic groups are attached to the epoxide-containing material through the esterification of a portion of or all of the epoxide groups with the acid substituent of the hydroxybenzoic acid. This attachment procedure we have defined as "capping." Typical acids contemplated by the present invention are exemplified by salicylic acid, meta- and para-hydroxybenzoic acid. The reaction of the hydroxybenzoic acid with the epoxide-containing material can be carried out by heating the reactants, usually in the presence of a solvent, to a temperature of from about 300° F. to about 375 F. and preferably to a temperature of from about 320° F. to about 355° F.

The reaction product of hydroxybenzoic acid with the epoxide-containing material is one component of the novel composition of this invention. The other component is a hardener component comprising a polyisocyanate. The polyisocyanate can be an aliphatic, cycloaliphatic, or aromatic polyisocyanate having preferably 2–5 isocyanate groups, or a polyisocyanurate made thereof. If desired, mixtures of polyisocyanates can be employed. Also contemplated for use in this invention are isocyanate prepolymers formed by reacting in excess, any of the above polyisocyanates with a polyhydroxy material such as a polyhydric alcohol, polyoxyalkylene-containing polyols, polyesters (i.e., adipic acid-propylene glycol-trimethylol propane polyester), and the like. Thus, a prepolymer of toluene diisocyanate and ethylene glycol or trimethylol propane (TMP) can be successfully employed in this invention. Suitable polyisocyanates include the aliphatic polyisocyanates such as hexamethylene diisocyanate, alicyclic polyisocyanates such as 4,4'-dicyclohexylmethane diisocyanate, and aromatic polyisocyanates such as 2,4- and 2,6-toluene diisocyanate (TDI), diphenylmethane diisocyanate, and the dimethyl derivatives thereof. Further examples of suitable polyisocyanates are trimethyl hexamethylene diisocyanate, lysine diisocyanate methyl ester (LDIM), alicyclic polyisocyanates such as isophorone diisocyanate, methyl cyclohexyl diisocyanate, 1,5-naphthalene diisocyanate, triphenylmethane triisocyanate, xylene and xylylene diisocyanate and the methyl derivatives thereof, polymethylene-polyphenyl isocyanates, chlorophenylene-2,4-diisocyanate, and the like. Although all polyisocyanates react with the hydroxybenzoic acid capped epoxide-containing compositions to form a crosslinked polymer structure, certain polyisocyanates are preferred. Where the ultimate composition of this invention is to be unpigmented, slightly pigmented, or pigmented with a light-colored pigment, the polyisocyanate component will be chosen because of its color stability characteristics. Apart from the characteristic of color stability, the preferred polyisocyanate components are normally chosen because of their greater reactivity. Generally speaking, the fastest curing time is obtained when aromatic polyisocyanates are used in this invention. Aliphatic polyisocyanates, while also yielding rapid cure in the presence of a tertiary amine, give somewhat slower cures than the aromatic polyisocyanates. The preferred polyisocyanate component is determined by the intended application of the composition of the instant invention. Where, for example, a colorless coating composition is desired, the choice of polyisocyanate should be such as not to impart undesirable color to the composition.

It has been found that the choice of polyisocyanate affects not only the original color of the coating but also the color after aging under conditions such as ultraviolet exposure. Among the preferred polyisocyanates are a reaction product of hexamethylene diisocyanate and toluene diisocyanate known and sold under the name Mondur HC (Mondur is a registered trademark); a TDI-TMP adduct known and sold under the name Mondur CB–60; aliphatic or aromatic diisocyanate adducts of polycaprolactones, polypropylene glycol ethers, or polyesters derived from polybasic acids and polyhydric alcohols; polymethylenepolyphenyl isocyanates known and sold under the name Mondur MR or Mondur MRS; TDI isocyanurate trimer; and the biurets, which are the reaction product of a polyisocyanate with water. One such biuret is known and sold under the name Desmodur N.

Of these polyisocyanate materials, those found to exhibit superior color properties are Mondur HC; Desmodur N; xylylene diisocyanate and polyisocyanates based thereon, such as a xylylene diisocyanate-TMP adduct.

The polyisocyanate is employed in sufficient concentrations to cause essentially complete curing of the hydroxybenzoic acid capped epoxide-containing compositions. In general, the polyisocyanate or a polyisocyanate prepolymer will be employed in a range of 10 to 500 weight percent of polyisocyanate based on the weight of the epoxide-containing material which has been reacted with a hydroxybenzoic acid. Preferably, from 20–300 weight percent of polyisocyanate on the same basis is employed. This amount is dependent upon the amount of NCO groups in the polyisocyanate component. The polyisocyanate is employed in liquid form. Liquid polyisocyanates can be employed in undiluted form. Solid or viscous polyisocyanates are employed in the form of organic solvent, the solvent being present in a range of up to 80% by weight of the solution.

The hydroxybenzoic acid capped epoxide-containing composition component of the instant composition is preferably employed as a solution in an organic solvent although the use of a solvent is not necessary in all cases. The nature and the effect on this solvent will be more specifically described below. The amount of solvent, if necessary, used should be sufficient to permit uniform application of these compositions. The specific solvent concentrations for the hydroxybenzoic acid capped epoxide-containing compositions will vary depending on the type of di- or poly-epoxide-containing material, the type of hydroxybenzoic acid employed and the molecular weight of the hydroxybenzoic acid capped epoxide-containing composition component. In general, the solvent concentration will be in the range of up to 80% by weight of the solution and preferably in the range of 5–80%.

The solvent employed in combination with either the hydroxybenzoic acid capped epoxide-containing composition or the polyisocyanate component or with both components does not enter to any significant degree into the reaction. In some cases, the difference in the polarity between the polyisocyanate and the said hydroxybenzoic acid capped composition component restricts the choice of solvents in which both components are compatible. Such compatibilty is necessary to achieve reaction and essentially complete curing of the novel compositions of the present invention. Where the hydroxybenzoic acid capped epoxide-containing composition and the polyisocyanate are compatible, no solvent is necessary and rapid room temperature cure of such mixtures can be effected in the presence of a tertitary amine. The solvent, if present, aids in the uniform distribution of the blend of ingredients on a substrate. Aromatic solvents, although compatible with the polyisocyanates, are less compatible with the capped epoxide-containing compositions. It is therefore preferred to employ combinations of solvents, and particularly combinations of aromatic and polar solvents. Suitable aromatic solvents are benzene, toluene, xylene, ethylbenzene, naphthalene, and mixtures thereof. The polar solvents should not be extremely polar such as to become incompatible with the aromatic solvent. Suitable solvents which are compatible with aromatic solvents include, in particular, ester, ketone, and ether solvents. These solvents should preferably not contain active hydrogen moieties reactive with the polyisocyanate. Preferred solvents include the esters of glycol ethers, such as ethylene glycol monoethyl ether acetate (known and sold under the name Cellosolve acetate) (Cellosolve is a registered trademark), ethylene glycol monobutyl ether acetate (known and sold under the name butyl Cellosolve acetate); ketone solvents, such as methyl isobutyl ketone and methyl heptyl ketone; butyl and ethyl acetate; and furfural.

It has also been found that the pot life of the blend of the polyisocyanate and the hydroxybenzoic acid capped epoxide-containing composition in a solvent or, where the two components are compatible, as a liquid blend with no solvent present, can be significantly improved without adversely affecting the rapid curing and finished film properties of the component blends. Pot life as used herein is defined as the time at which the blend can no longer be applied under normal application conditions. The pot life improvement is attained by the addition of an effective amount of either mineral or strong organic acids or acid halides. Acids which are useful include hydrochloric, phosphoric, trichloroacetic, benzene sulfonic acids, and the like. Phthaloyl chloride is particularly effective as an additive to improve the pot life of these blends. These acids or acid halides are used in concentrations up to 3% based on the nonvolatile content of the blend.

When the components described with particularity above are mixed and formed into, for example, a coating film, they can be rapidly and essentially completely cured to a tack-free state at room temperature in the presence of tertiary amines. These amines can be in a liquid or gaseous state. If the tertiary amine is in a liquid form, it can be admixed with the hydroxybenzoic acid capped epoxide-containing composition component. The polyisocyanate component can be added to this admixture (1) just prior to application of the said capped epoxide-containing components to the surface or substrate, as in the case of a two-head spray gun application, or (2) simultaneous with the application of the said capped epoxide-containing component to a surface or substrate, as in a roller coating application. Essentially complete curing occurs very rapidly at room temperature. When the tertiary amine is in a gaseous form or atomized in an inert carrier gas, an admixture of the hydroxybenzoic acid capped epoxide-containing composition component and the polyisocyanate, in the form of a film, can be rapidly cured simply by exposure of the film surface to the tertiary amine atmosphere. Suitable tertiary amines are gaseous tertiary amines such as trimethyl amine. However, normally liquid tertiary amines such as triethyl amine, ethyl dimethyl amine, and methyl diethyl amine are equally suitable. Although ammonia, primary amines and secondary amines exhibit some minor activity in causing a room temperature reaction, they are considerably inferior to the tertiary amines because they react with the polyisocyanate component. Functionally substituted amines such as dimethyl ethanol amine are included within the scope of tertiary amines and can be employed as curing agents. Functional groups which do not interfere in the action of the tertiary amine are hydroxy groups, alkoxy groups, amino and alkyl amino groups, ketoxy groups, thio groups, and the like. Tertiary amines containing active hydrogens are less preferred because of their potential reaction with the isocyanates. It is believed and only speculated for purposes of explanation that in the curing mechanism, the tertiary amine acts in such a manner as to convert the available phenolic moieties of the hydroxybenzoic acid capped epoxide-containing composition component from their condition of being weakly acidic into a relatively strong basic reactivity to facilitate the reaction of the aforesaid moieties with the polyisocyanate. A second curing step occurs in similar fashion between the polyisocyanate and the hydroxy group generated from the epoxide ring during the capping reaction. The mechanism of the former curing step is believed to be exemplified by the following equation:

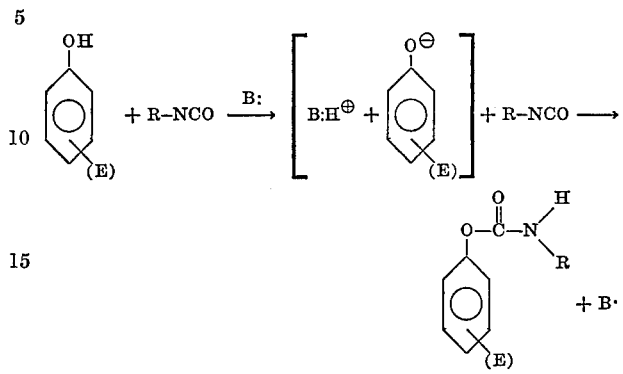

wherein

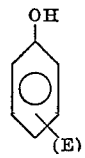

represents the hydroxybenzoic acid capped epoxide-containing composition, R represents the remainder of the polyisocyanate component, and B represents the tertiary amine. A similar mechanism is involved in the latter secondary curing step wherein

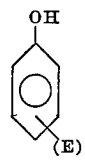

can be replaced by the following symbolic representation of the generated free hydroxy group:

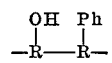

where pH represents the reacted phenolic group and

represents the organic moieties which were previously joined with the oxygen atom in the epoxide ring.

A distinct advantage of the present invention over the prior art, in addition to advantage of very rapid curing at room temperature, is the fact that the compositions of this invention can be mixed, while in their liquid state, with the tertiary amine in liquid form for totally liquid application as was briefly mentioned in the discussion of the two-head spray gun application previously. Once applied in liquid form, the compositions readily cure at room temperature to essentially their ultimate state for use. The compositions of the prior art, as exemplified in U.S. Pat. 3,409,579, cannot be so applied because of their almost instantaneous gellation upon contact with the tertiary amine. The compositions of this invention, while they cure very rapidly relative to the prior art systems, cure slow enough to allow premixing of the liquid tertiary amine with one of the two remaining components and good sprayability as a two-component system through a two-head spray gun. The slight delay in curing allows the entire composition to flow together smoothly on the surface to be sprayed and then readily cure to its ultimate state at room temperature. For these same reasons, brushing and rolling applications are possible.

This invention makes it possible to combine the disclosed components with pigments for use as rapid cure fillers for paneling materials such as chipboard. The fillers can be formulated by mixing a filler pigment, such as $CaCO_3$, with the hydroxybenzoic acid capped epoxide-containing polymer component in a ratio of from 6:1 to 0.1:1. These ingredients are normally blended with a high speed mixer. These pigmented components are then mixed with the polyisocyanate component and applied as fillers to the panel board. Curing is effected by bringing the above ingredients together with a tertiary amine. This invention also makes it possible to pigment the disclosed compositions in a similar manner with paint pigments, such as $TiO_2$, and thus provide a rapid cure general industrial enamel for a variety of uses as primers and final color coatings for wood, metal, etc. Furthermore, this invention makes it possible to provide for rapid cure filling, as discussed above, followed by rapid cure finishing to a high gloss with an unpigmented composition made according to this invention. Thus, this invention makes possible a number of rapid cure laminations according to the teachings of this invention: filling, printing, and high-gloss overcoating. Such pigmented filler or finishing compositions according to this invention cure rapidly to a handleable state, within the period of from about 5 minutes to about 45 minutes.

It is contemplated that the novel compositions and process of the instant invention, generally, will be useful as rapid cure printing inks; for finishing bowling alleys, bowling pins, sports equipment, furniture, insulation, cabinets and paper boxes; as chemical resistant coatings for concrete and jet fuel tanks; as floor and aircraft enamels; as marine paints; as tank linings; as binders for foundry cores; and in the production of factory finish wood products. These potential uses are by no means intended to be exclusive of other uses. Other applications of this invention will become readily apparent to one of ordinary skill in the art.

The examples serve only to illustrate the present invention and are not intended to limit the scope of the invention. All parts and percentages are by weight unless otherwise indicated.

Example I

The preparation of a phenolic functional composition from a bisphenol-epichlorohydrin resin, Epon 828:

| Component: | Amount |
|---|---|
| Epon 828 (Epon is a registered trademark and Epon 828 is an epichlorohydrin-Bisphenol A condensate having an average molecular weight of about 380) | 346.3 |
| Parahydroxybenzoic acid (PHBA) | 251.8 |
| Benzyl trimethyl ammonium hydroxide—20 percent solution in methanol (BTMAH) | 3.04 |
| Cellosolve acetate—urethane grade (CA) | 398.8 |
| | 999.94 |

The Epon 828, PHBA and BTMAH are charged to a reactor equipped with a stirrer and condenser. The reactor is heated to 325° F. under a nitrogen blanket and held for 5½ hours. After this time, the acid value of the reaction mixture has dropped to 38.5 indicating reaction of about 87.5 percent of the PHBA. The reactor is cooled and the product is reduced to about 60 percent nonvolatile with the CA. The product has a light pink color and a viscosity of 15 stokes at 25° C.

Example II

The preparation of a glycidyl functional acrylic copolymer and post reaction of this intermediate with PHBA to obtain a phenolic functional acrylic copolymer.

| Component: | Amount |
|---|---|
| n-Butyl methacrylate (BMA) | 12.33 |
| n-Butyl acrylate (BA) | 18.50 |
| Styrene (S+) | 15.41 |
| Glycidyl methacrylate (GMA) | 15.41 |
| Cumene hydroperoxide (CHP) | 0.62 |
| Cellosolve acetate—urethane grade (CA) | 20.57 |
| Cumeme hydroperoxide (CHP) | 0.31 |
| | 83.15 |
| Parahydroxybenzoic acid (PHBA) | 14.50 |
| Cellosolve acetate—urethane grade (CA) | 1.78 |
| Benzyl-trimethyl ammonium hydroxide—40% in methanol (BTMAH) | 0.60 |
| | 100.03 |

The 20.57 parts of CA are charged to a reactor equipped with a heating unit, thermometer, stirrer, and pressure gauge, and capable of withstanding pressure up to 300 p.s.i. The reactor is sealed and heated to 355° F. The BMA, BA, S+, and GMA monomers and the 0.62 part of CHP initiator are premixed and added to the reactor over a 2-hour period. The 0.31 part of CHP booster initiator is added 1 hour after completing the premix addition. After another 3 hours reaction at 355° F. the reactor is cooled to room temperature and vented. At this stage, the reaction mixture has a non-volatile of 72.5 percent, a viscosity of 15.3 stokes, and a Gardner color of 1+. The nonvolatile value indicates 96.5 percent conversion of monomer to polymer. The PHBA and a premix of the 1.78 parts of CA and the BTMAH are now added to the reaction mixture. A water cooled condenser is inserted into the reaction apparatus and the reactor is reheated to 335±5° F. and held at this temperature for about 12 hours. At this time, the acid value of the reaction mixture is 16. This indicates that about 80 percent of the available PHBA has reacted. The reactor is cooled to room temperature. The product has a nonvolatile of 75 percent and a viscosity of about 1100 stokes. It has a brown color which measures about 6 on the Gardner color scale.

The following examples illustrate the formation of the coatings according to the present invention.

Example III

The composition of a blend of the product of Example I with Mondur HC isocyanate intermediate and the properties of a film of this blend.

| Component: | Amount |
|---|---|
| Product of Example I | 50.5 |
| Mondur HC isocyanate intermediate | 42.2 |
| Cellosolve acetate—urethane grade | 5.9 |
| A saturated solution of HCl in Cellosolve acetate | 1.45 |
| | 100.05 |

The above components are mixed at room temperature. The blend will gel after standing about 24 hours. However, stability is adequate; the viscosity increases from 6 to 9 strokes over a 5-hour period.

A 1.5 mil wet film of this blend on a glass panel passes 500 grams Zapon in less than 15 seconds after being exposed to a triethyl amine saturated atmosphere for 15 seconds. The film at this point is hard to the touch and cannot be smeared or rubbed off the substrate by handling. Five hours after exposure, the clear film has a Sward hardness of 52, good flexibility, and is unaffected by 15 minutes exposure to liquid xylene. Long before this 5-hour period has elapsed, the film has become hard, durable and able to withstand the excessive handling required for storage and shipping, etc.

Example IV

The composition of a blend of the product of Example II with Mondur HC isocyanate intermediate, and the properties of a film of this blend.

| Component: | Amount |
|---|---|
| Product of Example II | 51.70 |
| Mondur HC isocyanate intermediate | 33.96 |
| Cellosolve acetate—urethane grade | 12.88 |
| A saturated solution of HCl in Cellosolve acetate | 1.45 |
| | 99.99 |

The above components are mixed at room temperature. The blend has only fair stability. Its viscosity increases from 22 to 67 stokes over 8 hours and it gels in less than 24 hours.

A 1.5 mil wet film of this blend on a glass panel passes 500 grams Zapon 20 seconds after being exposed to a triethyl amine saturated atmosphere for 15 seconds. The film at this point is hard to the touch and cannot be smeared or rubber off the substrate by handling. Eight hours after exposure to the tertiary amine, the film has a Sward hardness of 44, good flexibility, and is unaffected by 15 minutes of exposure to liquid xylene.

Having thus described the invention, we claim:

1. A novel cured composition comprising the reaction product of the admixture:
   (a) a hydroxybenzoic acid capped epoxide-containing composition component, said component being the reaction product of
      (1) a compound containing unreacted epoxide groups, and
      (2) up to a stoichiometric amount of a capping compound of the structure

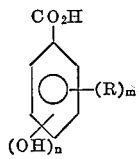

wherein R is selected from the group consisting of H, a $C_1$–$C_8$ alkyl group, and an aromatic substituent; $n+m$ cannot be greater than 5; and $n$ must be at least 1,
   (b) 10 to 500 weight percent of a hardener component comprising an organic polyisocyanate having at least 2 isocyanate groups, and
   (c) a curing agent comprising a tertiary amine in a small but effective amount.

2. The composition of claim 1 wherein said polyisocyanate is selected from the group consisting of aliphatic polyisocyanates; cycloaliphatic polyisocyanates; aromatic polyisocyanates; isocyanate prepolymers formed by reacting an excess of isocyanate equivalents of a member of the group consisting of aliphatic, cycloaliphatic and aromatic polyisocyanates with a polyhydroxy material; and mixtures thereof.

3. The composition of claim 1 wherein at least a part of said polyisocyanate is an aromatic polyisocyanate.

4. The composition of claim 1 wherein said hardener component is an organic solvent solution of a polyisocyanate.

5. The composition of claim 1 wherein said compound containing unreacted epoxide groups is selected from the group consisting of:
   (a) epoxidized fatty compounds,
   (b) alicyclic polyepoxides,
   (c) glycidyl-containing compositions,
   (d) epoxide-containing acrylic copolymers.

6. The composition of claim 5 wherein said epoxidized fatty compound is selected from the group consisting of epoxidized fatty oils; epoxidized fatty acid esters of monohydric and polyhydric alcohols; epoxidized fatty nitriles; epoxidized fatty amides; epoxidized fatty amines; epoxidized and fatty alcohols.

7. The composition of claim 5 wherein said alicyclic diepoxide is selected from the group consisting of substituted and unsubstituted di-epoxy cyclohexyl and di-epoxy cyclohexane carboxylates; dicyclopentadiene diepoxide; and limonene diepoxide.

8. The composition of claim 5 wherein said glycidyl-containing compositions are selected from the group consisting of:
   (a) diglycidyl ethers of a member selected from the group consisting of polyols, polyether polyols, and bisphenols;
   (b) the higher molecular weight materials prepared from bisphenol A and epichlorohydrin.

9. The composition of claim 5 wherein said epoxide-containing acrylic copolymers are prepared by the reaction of $C_1$–$C_8$ esters of alpha-beta unsaturated mono- and dicarboxylic acids with a member selected from the group consisting of epoxide-containing acrylate and methacrylate compounds; and glycidyl esters of $C_3$–$C_8$ alpha-beta unsaturated mono- or dicarboxylic acids.

10. The composition of claim 1 wherein said capping compound has the following structure:

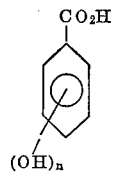

wherein $n$ is equal to 1.

11. The composition of claim 1 wherein said hydroxybenzoic acid capped epoxide-containing polymer component is in the form of an organic solvent solution.

12. The composition of claim 11 wherein said solvent is one in which both said hydroxybenzoic acid capped hydroxy-containing polymer and said polyisocyanate are soluble and wherein said solvent is present in the range of up to 80% by weight of the solution.

13. The composition of claim 1 wherein said tertiary amine is selected from the group consisting of triethyl amine, trimethyl amine, ethyl dimethyl amine, and methyl diethyl amine.

14. A novel cured composition comprising the reaction product of the admixture:
   (a) a hydroxybenzoic acid capped epoxide-containing composition component, said component being the reaction product of
      (1) a compound containing unreacted epoxide groups, said compound being selected from the group consisting of epoxidized fatty compounds; alicyclic polyepoxides; glycidyl-containing compositions; expoxide-containing acrylic copolymers; and
      (2) from 60–100 weight percent of a capping compound of the structure

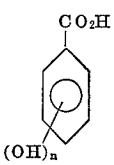

wherein $n$ is equal to 1,
   (b) a hardener component comprising an organic polyisocyanate having at least 2 isocyanate groups, said polyisocyanate being selected from the group consisting of aliphatic polyisocyanates; cycloaliphatic polyisocyanates; aromatic polyisocyanates; isocyanate prepolymers formed by reacting an excess of isocyanate equivalents of a member of the group consisting of aliphatic, cycloaliphatic and aromatic polyisocyanates with a polyhydroxy material, and
(c) a curing agent, in a small but effective amount, comprising a member from the group consisting of triethyl amine, trimethyl amine, ethyl dimethyl amine, and methyl diethyl amine.

15. A stable composition rapidly curable at room temperature with a tertiary amine comprising:
(a) A hydroxybenzoic acid capped epoxide-containing composition component, said component being the reaction product of
   (1) a compound containing unreacted epoxide groups, and
   (2) a capping compound of the structure

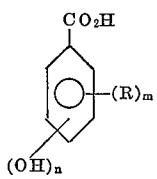

wherein R is selected from the group consisting of H, a $C_1$–$C_8$ alkyl group, and an aromatic substituent; $n+m$ cannot be greater than 5; and $n$ must be at least 1,
(b) a hardener component comprising an organic polyisocyanate having at least 2 isocyanate groups, and
(c) a stabilizing agent selected from the group consisting of mineral acids, strong organic acids, acid halides, in an amount of up to 3% by weight based on the nonvolatile content of said components (a) and (b).

16. A cured composition of improved properties comprising the crosslinking reaction product of:
(a) a hydroxybenzoic acid capped epoxide-containing composition component, said component being the reaction product of
(1) a compound containing unreacted epoxide groups, and
(2) from 20–100 percent of a capping compound of the structure

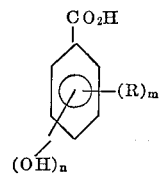

wherein R is selected from the group consisting of H, a $C_1$–$C_8$ alkyl group, and an aromatic substituent; $n+m$ cannot be greater than 5; and $n$ must be at least 1; and
(b) a hardener component comprising an organic polyisocyanate having at least 2 isocyanate groups;
(c) a curing agent comprising a tertiary amine in a small but effective amount.

References Cited
UNITED STATES PATENTS

| | | | |
|---|---|---|---|
| 3,404,018 | 10/1968 | Hicks | 260—47 |
| 3,265,666 | 8/1966 | Brown et al. | 260—47 |
| 3,476,795 | 11/1969 | Allan | 260—47 |
| 3,222,322 | 12/1965 | Nischk et al. | 260—47 |
| 3,073,802 | 1/1963 | Windemuth et al. | 260—77.5 |
| 2,692,873 | 10/1954 | Langerak | 260—2.5 |
| 3,477,990 | 11/1969 | Dante et al. | 260—47 |
| 3,547,881 | 12/1970 | Mueller et al. | 260—47 |

DONALD E. CZAJA, Primary Examiner

EUGENE C. RZUCIDLO, Assistant Examiner

U.S. Cl. X.R.

260—18 PF, 18 PT, 47 CB, 47 EP, 77.5 AP